Figure 1:
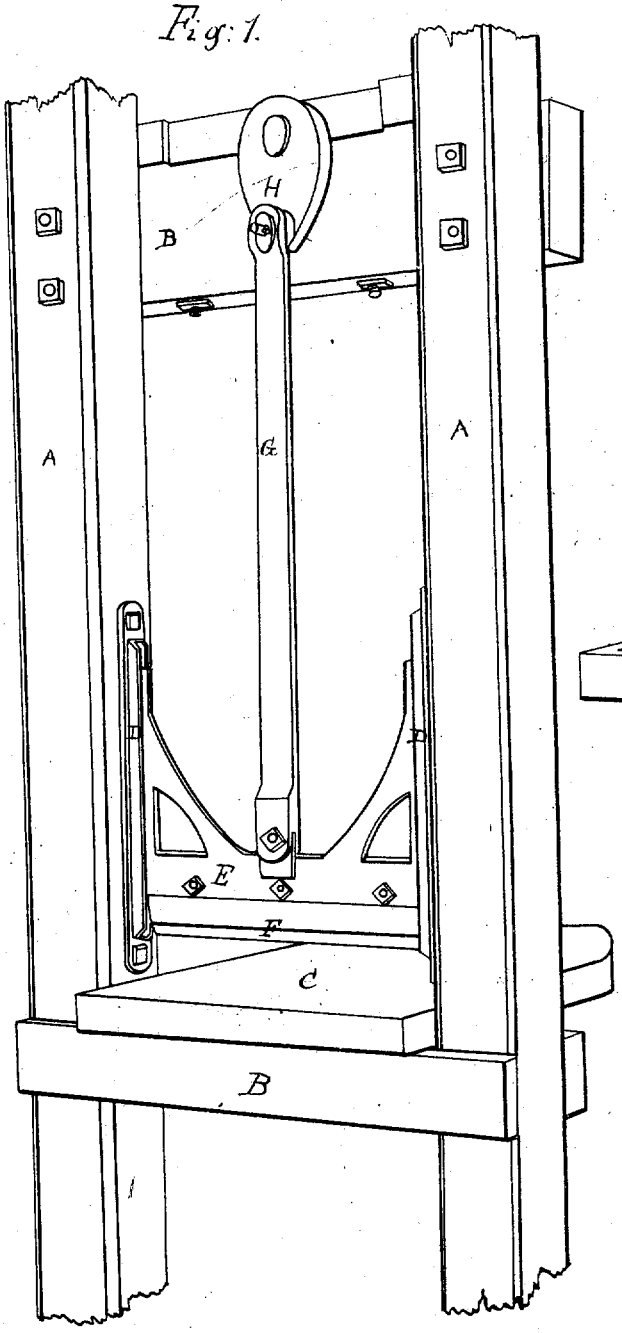
Figure 2:
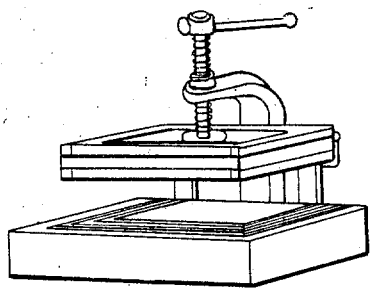

8029X

J. Ames.

Paper Trimming Mach.

No. Patented Feb. 28. 1834.

John Ames. Springfield Massachusetts
Letters Patent

The Schedule referred to in these Letters Patent and making part of the same containing a description in the words of the said John Ames himself of his improvement in the method of Cutting or trimming paper in the ream or other large quantity by machinery.

To all to whom these presents shall come. Be it known. That I John Ames of Springfield in the County of Hampden and commonwealth of Massachusetts, manufacturer, have invented a new and useful improvement in the machine for cutting or trimming paper in the ream and that the following is a full & exact description of the construction & operation of the said machine as invented or improved by me -

I construct my frame by setting up two studs or posts parallel to each other & about two feet apart with suitable beams one near the top and one at the bottom. Above the bottom beam and at a height and of a size convenient for performing the operations hereinafter described is constructed a platform. To the inner sides or faces of said studs I fasten perpendicularly plates of metal with suitable grooves in which the knife carriage is to be moved up and down - The knife carriage is of cast metal about half an inch thick and in width to fill the space between the studs the edges which are to slide in the grooves are to be properly adapted to them and should be at right angles to the lower or horizontal edge which is to be formed so as to fix firmly to it the horizontal knife in common use. The said knife is fixed with its edge parallel with the lower edge of the carriage. At the upper horizontal edge of the carriage and in the centre of it is attached by a tenon & mortice (so as to allow the requisite horizontal motion of the sweep) a shaft which extend upwards to an arbor and crank above, and is fixed to the crank which when put in motion by water, steam, or other power imparts

8029X a perpendicular motion to the knife carriage - These parts in
operation resemble the inverted action and motion of the sweep
and saw gate of a saw mill - The press or machine for holding
the paper when it is to be trimmed is of the form in use as de
=scribed in the accompanying drawing marked D, When the
ream to be trimmed is firmly adjusted in the press it is brought
under the knife in motion which ~~turns~~ trims the edges of the pa-
per or one side at a stroke and the other sides are in like
manner trimmed - I do not claim the knife or the
separate parts of said machine or said press as my inven-
=tion, but what I ~~xx~~ claim as my invention & improvement
is the combination of machinery in the manner above des-
cribed for the purposes aforesaid -

Witnesses
Saml. Bowles
Wm. Bliss

John Ames

Exd. W.G.

(Patented 28 Feby 1834)

(540 words)

Drawing